United States Patent
Chu et al.

(10) Patent No.: US 7,948,337 B2
(45) Date of Patent: May 24, 2011

(54) SIMULTANEOUS ROTATIONAL CONTROL USING OFFSET LINEAR ACTUATORS

(75) Inventors: Patrick Breckow Chu, Wexford, PA (US); Narayanan Ramakrishnan, Pittsburgh, PA (US); Mark David Bedillion, Allison Park, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 393 days.

(21) Appl. No.: 11/755,812

(22) Filed: May 31, 2007

(65) Prior Publication Data

US 2008/0297289 A1 Dec. 4, 2008

(51) Int. Cl.
*H01H 51/22* (2006.01)
(52) U.S. Cl. .......................................................... 335/78
(58) Field of Classification Search .................... 335/78; 369/126; 250/442.11
See application file for complete search history.

(56) References Cited

U.S. PATENT DOCUMENTS

| | | | | |
|---|---|---|---|---|
| 5,266,988 A * | 11/1993 | Washisu | ........................ | 396/55 |
| 5,329,122 A * | 7/1994 | Sakai et al. | ........................ | 850/10 |
| 5,426,631 A * | 6/1995 | Miyazaki et al. | ............... | 369/126 |
| 5,536,988 A * | 7/1996 | Zhang et al. | .................. | 310/309 |
| 5,557,596 A | 9/1996 | Gibson et al. | | |
| 5,615,143 A * | 3/1997 | MacDonald et al. | ......... | 365/112 |
| 5,679,952 A | 10/1997 | Lutwyche et al. | | |
| 5,680,387 A * | 10/1997 | Yamano et al. | ............... | 369/126 |
| 5,751,684 A * | 5/1998 | Takeda et al. | .................. | 369/126 |
| 5,801,472 A * | 9/1998 | Wada et al. | .................... | 310/309 |
| 5,834,864 A | 11/1998 | Hesterman et al. | | |
| 5,883,742 A * | 3/1999 | Kamata | ........................ | 359/557 |
| 6,029,009 A * | 2/2000 | Imura | ............................. | 396/55 |
| 6,154,611 A * | 11/2000 | Washisu | ........................ | 396/55 |
| 6,310,342 B1* | 10/2001 | Braunstein et al. | ............... | 850/2 |
| 6,369,400 B1* | 4/2002 | Haeberle et al. | ............. | 250/548 |
| 6,397,008 B2* | 5/2002 | Kuwana et al. | ................. | 396/55 |
| 6,459,088 B1* | 10/2002 | Yasuda et al. | ............ | 250/442.11 |
| 6,484,602 B1 | 11/2002 | Dagalakis et al. | | |
| 6,507,553 B2 | 1/2003 | Kley | | |
| 6,509,620 B2* | 1/2003 | Hartwell et al. | ............... | 257/415 |
| 6,509,670 B2* | 1/2003 | Jeong et al. | .................. | 310/309 |
| 6,512,313 B2* | 1/2003 | Choi et al. | ................. | 310/12.03 |
| 6,545,385 B2* | 4/2003 | Miller et al. | .................. | 310/309 |
| 6,587,408 B1* | 7/2003 | Jacobson et al. | ........... | 369/44.16 |
| 6,638,625 B1 | 10/2003 | Draeger | | |
| 6,724,712 B2 | 4/2004 | Kley | | |
| 6,735,163 B2* | 5/2004 | Marshall | ....................... | 369/126 |

(Continued)

OTHER PUBLICATIONS

U.S. Appl. No. 11/654,720, filed Jan. 18, 2007, Liem et al.

(Continued)

*Primary Examiner* — Elvin G Enad
*Assistant Examiner* — Alexander Talpalatskiy
(74) *Attorney, Agent, or Firm* — Robert P. Lenart, Esq.; Pietragallo Gordon Alfano Bosick & Raspanti, LLP (57) ABSTRACT

An apparatus includes a movable member, and first and second actuators coupled to the movable member at positions offset from a first axis that passes through a centroid of the movable member. A controller independently controls the first and second actuators to exert a first force on the movable member in a direction generally parallel to the first axis, thereby controlling both linear and rotational orientation of the movable member. The apparatus can further include third and fourth actuators coupled to the movable member at positions offset from a second axis that passes through the centroid of the movable member, and the controller can independently controlling third and fourth actuators.

15 Claims, 6 Drawing Sheets

U.S. PATENT DOCUMENTS

| | | | |
|---|---|---|---|
| 6,784,771 B1* | 8/2004 | Fan | 335/78 |
| 6,822,933 B2 | 11/2004 | Ives | |
| 6,882,019 B2 | 4/2005 | Walmsley et al. | |
| 6,925,047 B2 | 8/2005 | Ives | |
| 6,996,051 B2* | 2/2006 | Ives et al. | 369/126 |
| 7,030,964 B2* | 4/2006 | Akutsu et al. | 355/53 |
| 7,057,997 B2* | 6/2006 | Birecki et al. | 369/101 |
| 7,142,077 B2* | 11/2006 | Baeck et al. | 335/78 |
| 7,148,549 B2* | 12/2006 | Ives et al. | 257/420 |
| 7,440,687 B2* | 10/2008 | Seo | 396/55 |
| 2001/0004420 A1* | 6/2001 | Kuwana et al. | 396/55 |
| 2003/0201856 A1* | 10/2003 | Harney | 335/78 |
| 2004/0155737 A1* | 8/2004 | Wakatsuki et al. | 335/78 |
| 2004/0174237 A1* | 9/2004 | Matsumoto | 335/78 |
| 2005/0040919 A1* | 2/2005 | Baeck et al. | 335/78 |
| 2005/0046504 A1* | 3/2005 | Xiaoyu et al. | 331/154 |
| 2005/0128616 A1* | 6/2005 | Johns et al. | 360/15 |
| 2005/0190684 A1 | 9/2005 | Kley | |
| 2006/0018645 A1* | 1/2006 | Stavely | 396/55 |
| 2006/0023606 A1* | 2/2006 | Lutwyche et al. | 369/100 |

OTHER PUBLICATIONS

M. I. Lutwyche et al., "Millipede—A Highly-Parallel Dense Scanning-Probe-Based Data-Storage System," Digest of Technical Papers—IEEE International Solid-State Circuits Conference, Feb. 7-9, 2000, pp. 126-127, 450.

* cited by examiner

SIMULTANEOUS ROTATIONAL CONTROL USING OFFSET LINEAR ACTUATORS

FIELD OF THE INVENTION

This invention relates to positioning devices and, more particularly, to micro-positioning devices.

BACKGROUND OF THE INVENTION

Various types of actuation systems, such as micro-positioners, translating stages, scanners, or actuated systems with gliding surfaces have been proposed to provide precise positioning of movable components.

One type of device that requires the precise positioning of a movable member is a scanning data storage device that includes one or more heads or tips that move relative to a storage media. Scanning probe storage devices have been proposed to provide small size, high capacity, low cost data storage devices. Actuators are used to effect relative movement between a storage media and an array of tips or heads. The heads and storage media can be located on wafers that are separated by a gap. To achieve a high areal data storage density, the relative displacement of the heads and the storage media should be precisely controlled.

Multiple tips are accessed simultaneously to meet data rate requirements, and these tips form a row of an overall head array. Data are written and read in tracks on the storage media. A row of tips is desirable for a simultaneous reading unit because uniform thermal expansion of the components does not generate off-track motion between tips in a row.

A servo system is used to control the relative position of the heads and the storage media. The servo system can be adversely affected by rotational movement of the media with respect to the head array. Only a small amount of rotation is required to misalign a row of tips, such that the first and last heads in the row are off-track.

In one example, the storage media is mounted on a movable sled supported by springs. Positioning of the media relative to the head array is accomplished using actuators providing linear actuation along the two in-plane axes. Torque can be generated by static misalignment of the geometric centroid and center of mass of the media-sled assembly. In addition, the misalignment can also cause linear dynamic disturbances to have rotational components. Another source of torque disturbance comes from the linear actuation forces or spring attachment points not being aligned with the media-sled assembly center of mass due to manufacturing tolerances. Even a relatively small offset can cause one of the actuators to generate a torque sufficient to cause unacceptable track misregistration (TMR). Other external disturbances include rotational and linear shock and vibration. Furthermore, the presence of head-media friction may result in a steady-state error at the end of a shock event. This steady-state error should also be addressed by the position control system.

While a balancing process during fabrication is likely, it is unlikely that this process will be accurate enough to create a completely balanced system. Given the low rotational stiffness of existing media-sled assemblies and the extremely tight angular tolerance, relatively minor rotational disturbances can cause an undesirable amount of track misregistration.

It would be desirable to provide active control of the rotation of the movable member to meet system requirements.

SUMMARY OF THE INVENTION

In a first aspect, the invention provides an apparatus including a movable member, and first and second actuators coupled to the movable member at positions offset from a first axis that passes through a centroid of the movable member. A controller independently controls the first and second actuators to exert a first force on the movable member in a direction generally parallel to the first axis, thereby controlling both linear and rotational orientation of the movable member.

The apparatus can further include third and fourth actuators coupled to the movable member at positions offset from a second axis that passes through the centroid of the movable member, and the controller can independently control third and fourth actuators.

The apparatus can include one or more of electromagnetic actuators, piezoelectric actuators, electrorheological fluid actuators, electrostatic actuators, shape memory alloy actuators, or thermal actuators.

In another aspect, the invention provides an apparatus including a data storage media, an array of tips positioned adjacent to the data storage media, a movable member coupled to either the data storage media or the array of tips, and first and second actuators coupled to the movable member at positions offset from a first axis that passes through a centroid of the movable member. A controller independently controls the first and second actuators in response to position signals and/or servo information to exert a first force on the movable member in a direction generally parallel to the first axis.

The apparatus can further include third and fourth actuators coupled to the movable member at positions offset from a second axis that passes through the centroid of the movable member, and the controller can independently control third and fourth actuators. A plurality of posts can be included to define a distance between the data storage media and the tip substrate.

DETAILED DESCRIPTION OF THE INVENTION

This invention provides an apparatus including actuators for moving a movable member in a plane. The actuators control both linear and rotational movement of the movable member. In another aspect, this invention provides data storage devices that include actuators for providing relative movement between a plurality of tips and an adjacent storage media.

Figure 1:
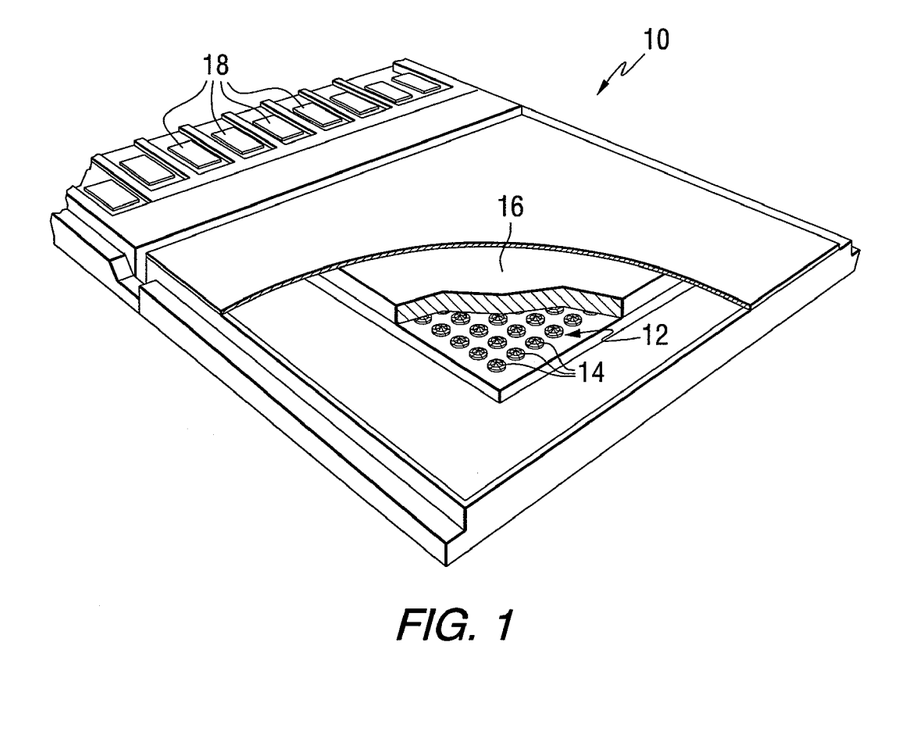
FIG. 1 is a perspective view of a data storage device that can include an actuator constructed in accordance with an aspect of the invention.

Referring to the drawings, FIG. 1 is a perspective view of a data storage device 10 that can be constructed in accordance with an aspect of the invention. In the storage device 10 of FIG. 1, an array 12 of tips 14, also called probes or heads, is positioned adjacent to a storage media 16. The ends of the tips 14 and a recording surface of the storage media 16 lie in planes that are generally parallel to each other. The tips 14 are electrically coupled to connectors 18 through read and/or write circuitry (not shown). Either the storage media 16 or the tip array can be coupled to at least one actuator (not shown in this view), which is configured to provide relative movement between the storage media 16 and the tips of the array 12. This movement causes individual storage locations or domains on the media 16 to be moved relative to the tips. Each tip can include one or more electrodes. The storage media in the example of FIG. 1 can be, for example, a ferroelectric, magnetic or optical storage media. However, the storage device aspect of the invention is not limited to any particular type of storage media. Storage devices, such as those in FIG. 1, can be called probe storage devices.

Figure 2:
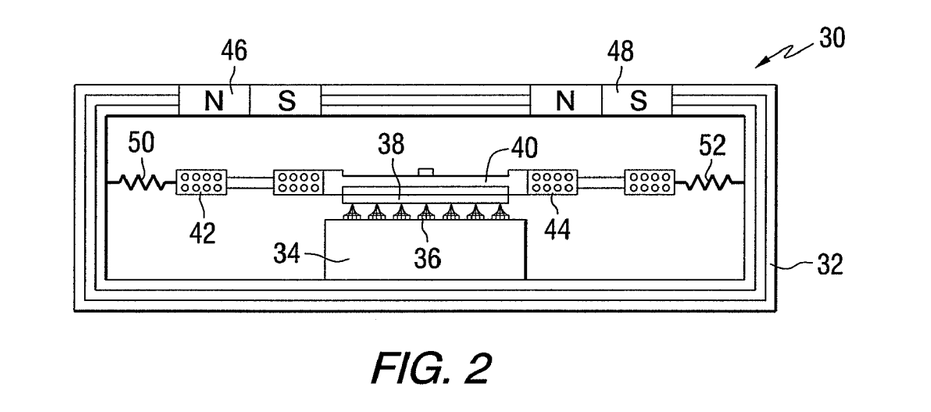
FIG. 2 is a schematic representation of a data storage device.

FIG. 2 is a cross-sectional view of a data storage device 30. The device includes an enclosure 32, also referred to as a case, base, or frame, that contains a substrate 34, which is referred to as a head substrate. An array of tips 36 is positioned on the substrate. The tips extend upward to positions adjacent to, or in contact with, a storage media 38. In this example, the storage media 38 is mounted on a movable member, or sled 40. Relative movement between the storage media and the tip array is provided by electromagnetic actuators that include coils and magnets. Coils 42 and 44 are mounted on the movable member. Magnets 46 and 48 are mounted in the enclosure near the coils. Springs 50 and 52 form part of a suspension assembly that supports the movable member. The enclosure 32 can be formed of, for example, injection molded plastic. While FIG. 2 shows one example of a probe storage device, it will be recognized that other known types of suspensions and actuators can be used to position the components and to provide relative movement between the tips and the storage media. The storage device aspect of this invention is not limited to devices that use any particular tip array and storage media.

Figure 3:
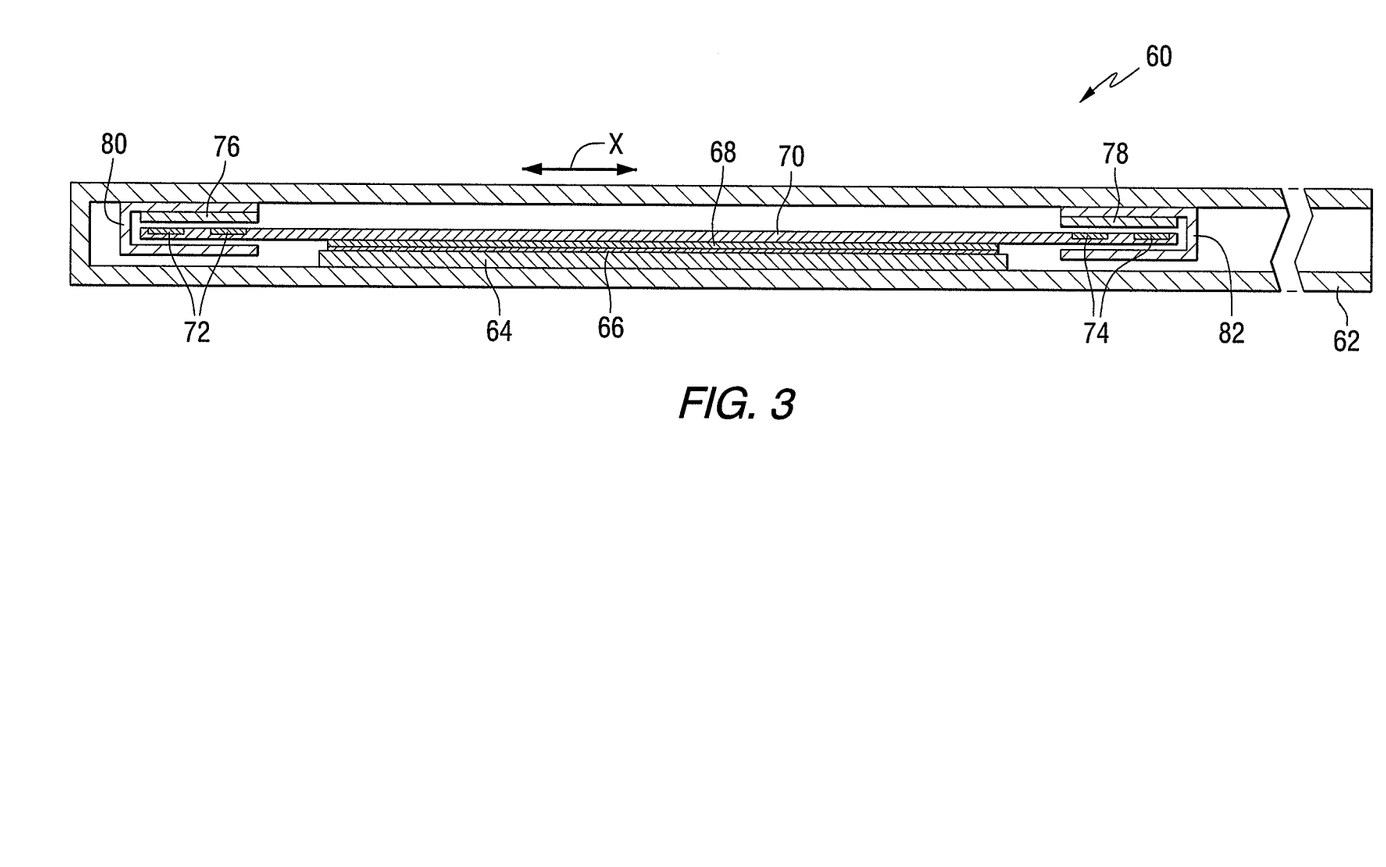
FIG. 3 is a cross-sectional view of a data storage device.

Devices constructed in accordance with this invention include actuators for moving the movable member in a plane. When used in a data storage device, the invention can be used to move a storage media or array of tips to provide relative movement between the storage media and the array of tips. FIG. 3 is a cross-sectional view of a data storage device 60 including an actuator assembly constructed in accordance with an example of the invention. The device includes an enclosure 62, also referred to as a case, base, or frame, which contains a head substrate 64. An array of tips 66 is positioned on the substrate. The tips extend upward to positions that are adjacent to, or in contact with, a storage media 68. The storage media 68 is mounted on a movable member, or sled 70. Coils 72 and 74 are mounted on the movable member. Magnets 76 and 78 are mounted near the coils and magnetically coupled to magnetic keepers 80 and 82. The enclosure 62 can be formed of, for example, injection molded plastic. Alternatively, the coils can be mounted in the enclosure, with the magnets being mounted on the movable member. The combination of coils and magnets forms actuators that are used to move the movable member. Electric current in the coils creates a magnetic field that interacts with the magnetic field produced by the magnets to produce a force that has a component in the plane of the movable member and causes linear movement of the movable member. While this example uses electromagnetic actuators, other types of actuators such as piezoelectric, electrorheological fluid (ERF), electrostatic, shape memory alloy, or thermal actuators can also be used.

The springs and magnetic keepers can act as heat dissipation elements. The springs can also be electrically connected to the actuators to serve as conductors that deliver current to the actuators.

Figures 4, 5:
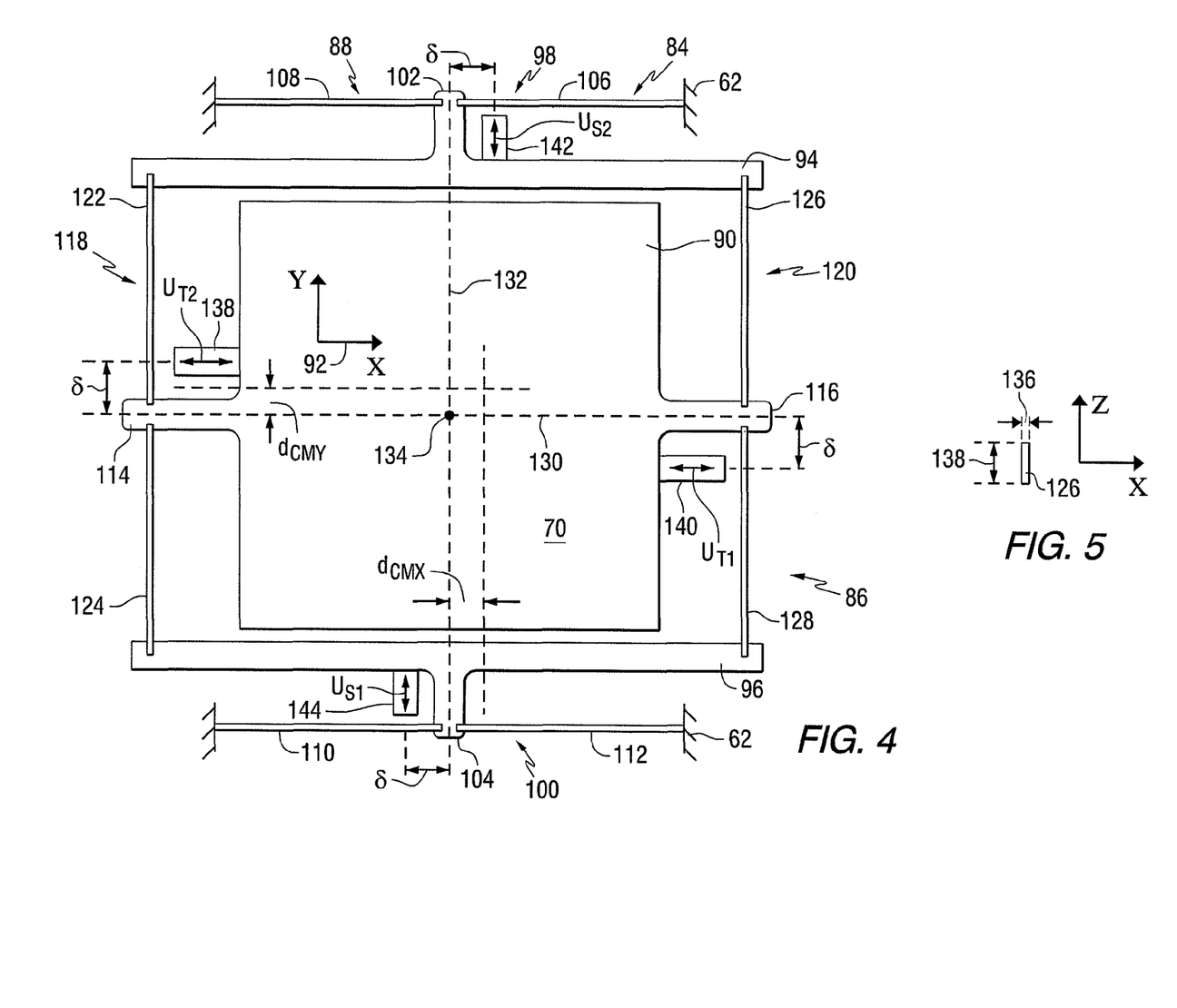
FIG. 4 is a top view of a positioning system of the probe storage device of FIG. 3.
FIG. 5 is a cross-sectional view of a spring.

FIG. 4 is a plan view of a movable member 70 coupled to a support assembly 84 including suspension assemblies 86 and 88, that can be used in one aspect of the invention. However, this invention is not limited to use with any particular suspension assembly. In the example of FIG. 4, the movable member 70, which may be used to position a storage media or may itself be a storage media, includes a planar portion 90. The movable member can move in a plane illustrated by X-Y axes 92. Suspension assembly 88 includes first and second rigid members or bars 94 and 96, and first and second spring assemblies 98 and 100, which provide elastic coupling between the enclosure 62, and the rigid members or bars. Protrusions 102 and 104 extend from a central portion of rigid members 94 and 96 respectively, in a direction parallel to the plane (or in the plane) of the movable member. The rigid members 94 and 96 are shown to extend beyond the edges of the movable member. The rigid members form an outer stage or gimbal. In other examples, these rigid members could be replaced by another outer stage structure, such as a rigid frame or a continuous circular ring.

In FIG. 4 each of the suspension assemblies includes two spring assemblies, each having two springs. In suspension assembly 88, spring assembly 98 is shown to include a first spring 106 extending between the base or enclosure 62 and protrusion 102, and a second spring 108 extending between the base 62 and protrusion 102. Spring assembly 100 is shown to include a third spring 110 extending between the enclosure 62 and protrusion 104, and a fourth spring 112 extending between the enclosure 62 and protrusion 104.

Suspension assembly 86 includes spring assemblies 118 and 120. Spring assembly 118 is shown to include a first spring 122 extending between rigid member 94 and protrusion 114, and a second spring 124 extending between rigid member 96 and protrusion 114. Spring assembly 120 is shown to include a third spring 126 extending between rigid member 94 and protrusion 116, and a fourth spring 128 extending between rigid member 96 and protrusion 116.

In an alternative example, each spring assembly can include a single spring that passes through, is embedded in, or is otherwise attached to one of the protrusions. For example, springs 106 and 108 could be replaced by a single spring that is connected at its ends to the base and is connected at its center to protrusion 102. Similarly, each pair of springs in each spring assembly could be replaced by a single spring.

The ends or attachment points of the springs can be encapsulated in, or built into, plastic injection molded parts. They could alternatively be glued. The springs can be made of steel, although another metal, or silicon, would be a possible substitute. Silicon has the advantage that extremely high aspect ratios are achievable.

Protrusions 114 and 116 extend from central portions of opposite sides of the movable member and lie along a first axis 130 that passes through a centroid 134, or center of mass, of the movable member. Protrusions 102 and 104 extend from central portions of the bars 94 and 96 and lie along a second axis 132 that passes through the centroid 134, or center of mass, of the movable member. The second axis is substantially perpendicular to the first axis.

First and second actuators 138 and 140 are coupled to the movable member at points that are offset with respect to the first axis by a distance δ. Third and fourth actuators 142 and 144 are coupled to the bars at points that are offset with respect to the second axis by a distance δ. While the actuators in FIG. 4 are all shown to be offset by a distance δ with respect to an adjacent axis, the offset differences need not be equal to each other. For example, each of the actuators could be offset from that adjacent axis by a different distance δ.

In another example, the support assembly need not be attached to the movable member at points along an axis that passes through the centroid of the movable member. For instance, there could be two protrusions instead of one (such as 114) that are positioned symmetric about the axis of symmetry of the sled with one spring each on the support assembly terminating at each of the protrusions. It is desirable that the net support assembly spring forces are directed along the first and second axes to minimize sensitivity to rotational disturbances.

The actuators can be linear actuators. As used herein, linear actuators are actuators that produce a force that is in a direction substantially along a straight line. In the example of FIG. 4, the first and second actuators produce forces $U_{S1}$ and $U_{S2}$ on the movable member in directions substantially parallel to the first axis. In this example, S refers to the scanning direction. The third and fourth actuators produce forces $U_{T1}$ and $U_{T2}$ on the second suspension assembly, and thereby on the movable member as well, in directions substantially parallel to the second axis. In this example, T refers to the tracking direction. Since the actuators are offset with respect to the first and second axes, the actuators also produce rotational forces on the movable member.

All springs should be stiff in the Z-direction (i.e., perpendicular to the X-Y plane) and less stiff in the X or Y-direction. FIG. 5 is a cross-sectional view of one of the springs 126. In this example, the springs have a rectangular cross-sectional shape, with a relatively high aspect ratio (for example greater than 5) such that width 136 of the springs in the X or Y-direction is substantially less than the thickness 138 of the springs in a direction perpendicular to the X-Y plane (i.e., the Z-direction). The springs simultaneously provide the required vertical stiffness in the Z-direction and horizontal flexibility in the X or Y-direction.

The actuators could be mechanically coupled to the media-sled assembly in a variety of ways. In one example that uses an electromagnetic actuator, the actuator coils can be for instance attached (e.g., overmolded or glued) to the end of the protrusions 102, 104, 114 and 116. The coils would then be interposed between a magnet pair and a keeper surface on the opposite side as illustrated in FIG. 2. The magnet-keeper assembly in this case could be overmolded or glued to the packaging or frame. The offset linear actuation forces in this case could be produced by mounting the actuator coils asymmetrically (about the central axes) on the protrusions 102, 104, 114 and 116.

Figure 6:
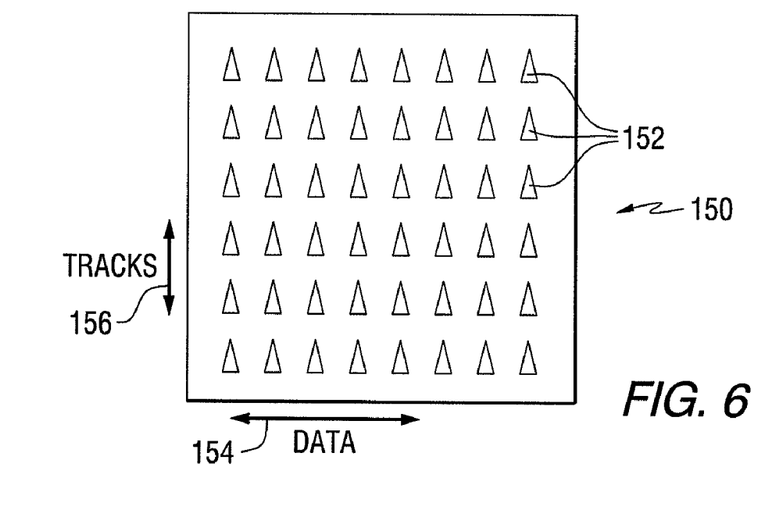
FIG. 6 is a schematic representation of a tip array.

FIG. 6 is a schematic representation of a tip array 150 including a plurality of tips 152 arranged in a rectangular pattern. A limited number of tips are shown for clarity. Multiple tips can be accessed simultaneously to achieve the desired data rate. The data can be accessed by moving the storage media mounted on a sled relative to the head wafer in the data direction 154, also called the scanning direction, and stepping between tracks in the track direction 156, also called the tracking direction.

In one aspect, this invention provides rotational compensation by using offset linear actuators for actuation of the sled assembly in the X-Y plane in opposite directions with respect to the axis of symmetry of the sled assembly passing through its geometric centroid. By independently controlling a control input to each of the actuators, a control torque can be generated to compensate for rotational disturbances on the sled assembly while simultaneously achieving positioning in the X-Y plane.

Figure 7:
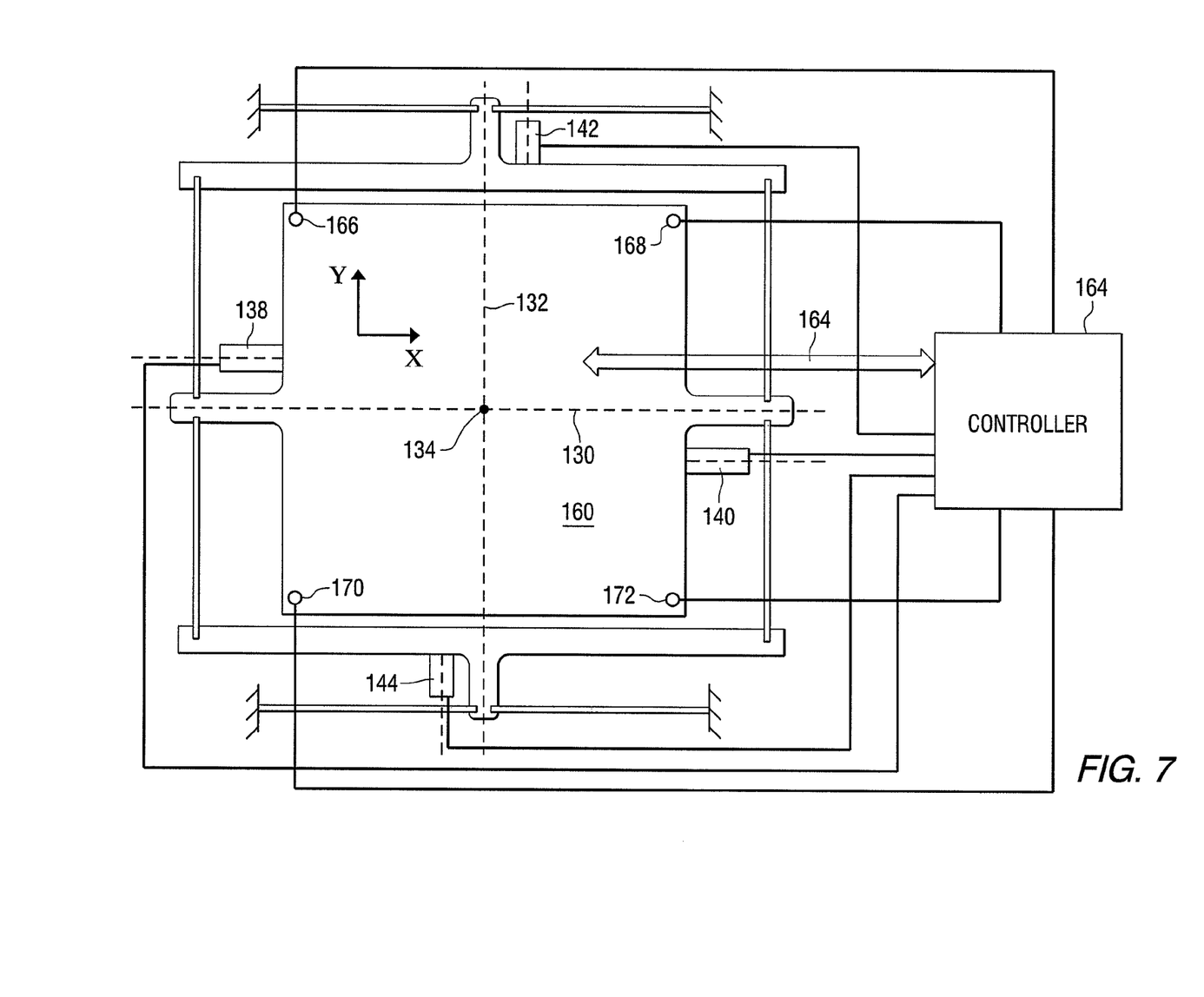
FIG. 7 is a schematic representation of a data storage device including a controller.

FIG. 7 is a block diagram of a system that includes a controller that can control the movement of a movable member 160. In an example wherein the system includes a data storage device, the controller 162 sends and receives write and read signals to a plurality of tips (not shown in this view) over a bus 164. Position sensors 166, 168, 170 and 178 are provided on or adjacent to the movable member. In this example, the position sensors are located near the corners of the movable member. The position sensors can be, for example, capacitive, magnetic or optical sensors, or piezoelectric strain gages that can be embedded in or attached to the spring supports.

The controller also provides control signals to the actuators 138, 140, 142 and 144. Independent control inputs to the actuators can be computed using a control algorithm that is based on feedback information of the rotation of the movable member, which can be referred to as a sled. In one example, the position sensors produce signals that are representative of the position of the movable member. These signals can be processed by the controller to determine the control signals to be supplied to the actuators. The position sensors can be used for both position and rotation detection.

The sled rotation could also be computed, for example, based on positional information at the four corners of the media sensed using wafer-to-wafer edge sensors, servo information embedded in the storage media near each tip, or a combination of the two approaches. Using the sensors in tandem allows estimation of, both linear X-Y position, as well as angular position of the media relative to the head array. The actuators that are positioned near each axis form an actuator pair. For example, actuators 138 and 140 form a first pair and actuators 142 and 144 form a second pair.

The two independent inputs to the actuator pair for tracking can be feedback-controlled to provide the required force for seeking or staying on track and at the same time can generate a control torque for compensating external torques and rotational disturbances. A rotary response control scheme could be implemented using offset actuators along either the scanning or tracking direction only. However, by using offset pairs of actuators in both scanning and tracking directions, the servo gain of the rotary response control scheme can be increased.

Briefly, the position sensors give a measurement of x, y, and θ, where θ is an angle of rotation. The device is desired to follow trajectories specified by $R_x$ and $R_y$ (alternatively referred to as $R_{tracking}$ and $R_{scanning}$) with the θ trajectory equal to 0. The controller takes the error signals and determines correction signals to apply to the actuators. Conceptually, the controller is generating three true control signals (one for x, one for y, and one for θ) and then transforming them into four actuator inputs through the second operation in the controller block. The plant then has a dynamic response to the four control inputs, which shows up in the sensor measurements.

Figure 8:
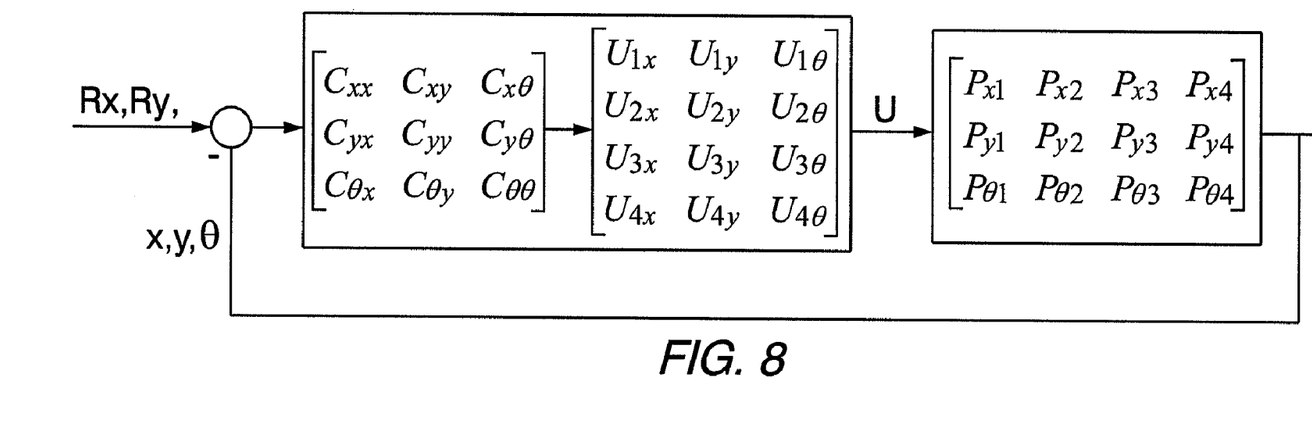
FIG. 8 is a schematic diagram that illustrates a servo function.

FIG. 8 is a schematic diagram that illustrates a servo function. In FIG. 8, U is the vector of four control inputs that go to the four coils of the actuators. In FIG. 8, $C_{ij}$ represents the controller transfer functions from the $i^{th}$ error signal to the $j^{th}$ control output; $U_{ij}$ represents the mapping from the $i^{th}$ control output to the $j^{th}$ physical input, and $P_{ij}$ represents the plant transfer function from the $i^{th}$ physical input to the $j^{th}$ plant output. Note that if coils on only one axis are offset, only three control inputs are required to achieve x, y, and θ control. The data controller, as referenced in the following paragraph, is largely independent of the actual feedback control and is mostly concerned with read/write operations. From a servo perspective, the only relevant operation of the data controller is to generate the reference signals $R_x$ and $R_y$.

The use of an offset pair of linear actuators for rotational compensation of the sled assembly is applicable to any type of linear actuators including, but not limited to, electromagnetic, piezoelectric, ERF, electrostatic and thermal actuators. Appropriate control algorithms can be developed for any particular type of linear actuators so as to independently control the inputs to the offset pair of actuators in order to generate the required compensating torque.

For the example of FIG. 4, the total control torque about the geometric centroid is given by $$T_{control} = (U_{T1} - U_{T2}) \cdot \delta + (U_{S1} - U_{S2}) \cdot \delta, \quad (1)$$

where U is the force applied by the actuators, $\delta$ is the offset distance of the actuators from an adjacent axis, subscript T1 refers to a first actuator applying a force in the tracking direction, subscript T2 refers to a second actuator applying a force in the tracking direction, subscript S1 refers to a first actuator applying a force in the data or seek direction, subscript S2 refers to a second actuator applying a force in the data or seek direction. In one example, $U_{T1}$ and $U_{T2}$ are assumed positive in the positive X-direction and $U_{S1}$ and $U_{S2}$ are assumed positive in the positive Y-direction.

An external disturbance in general can be a combination of rotational and linear disturbances coupled with an imbalance of the center of mass. The total external disturbance coupled about the geometric centroid can be represented as $$T_{external} = T_{rot} + F_{linearX} \cdot d_{CMy} + F_{linearY} \cdot d_{CMx}, \quad (2)$$

where $T_{external}$ includes any kind of rotational disturbances in the form of pure moments, $F_{linearX}$ is a force applied in a direction parallel to the X-direction, $F_{linearY}$ is a force applied in a direction parallel to the Y-direction, $d_{CMy}$ is the Y-direction offset of the media-sled assembly center of mass from its geometric centroid, and $d_{CMx}$ is the X-direction offset of the media-sled assembly center of mass from its geometric centroid.

Then $$I \cdot \alpha = T_{control} + T_{external} \quad (3)$$

where $\alpha = d^2\theta/dt^2$, and where I is the moment of inertia of the sled assembly, $T_{control}$ is the control input, $T_{external}$ is the vector sum total of external torque disturbances, $\alpha$ is the rotational acceleration of the sled assembly, and $\theta$ is the angular rotation of the media-sled assembly. It is desired to stabilize the rotation of the system such that $\theta \rightarrow 0$ in the shortest possible time.

In addition, the actuation forces along the scanning and tracking directions at a given time need to have specific values, referred to as $F_{Xrequired}$ and $F_{Yrequired}$. Therefore $$U_{T1} + U_{T2} = F_{Xrequired} \quad (4)$$

$$U_{S1} + U_{S2} = F_{Yrequired} \quad (5)$$

The use of four offset actuators therefore provides some redundancy in the control. This can possibly be used to optimize some performance parameter related to the rotational dynamics and its control. One such objective function could be the power or control effort spent in compensating the rotational disturbance.

The use of offset actuators for rotational control eliminates the need for additional actuators for rotational control, resulting in significant cost savings and simplicity of the solution. By exploiting the redundancy in the controllable degrees of freedom, rotational control can be achieved optimally, while simultaneously minimizing the penalty on linear actuation force. The control scheme can be easily incorporated in a MIMO control framework that is required for control of linear XY-motion of the movable member. The invention can be applied to any XY-motion platform that requires positional accuracy.

Various actuator geometries can be used, including a pair of offset actuators along the scanning axis, a pair of offset actuators along the tracking axis, or pairs of offset actuators along both the scanning and tracking axes. The use of offset actuators for primary actuation of the sled assembly in the X-Y plane provides a cost-effective solution to the problem of controlling rotational disturbances in a probe-like device. Since only the primary actuators are used, the need for additional actuators for rotation control is eliminated, thus resulting in significant cost savings and reduced complexity of the mechanical architecture of the device.

The invention can achieve rotational control simultaneously with linear actuation of the sled along both X and Y-axes using the same set of actuators. The system exploits redundancy in the controllable degrees of freedom (e.g., up to four control inputs and three kinematic variables that need to be controlled) to optimize a suitable performance measure, for example, minimize the effort required for rotational control or minimize penalty on linear actuation force due to simultaneous rotational control using offset actuators.

Figure 9:
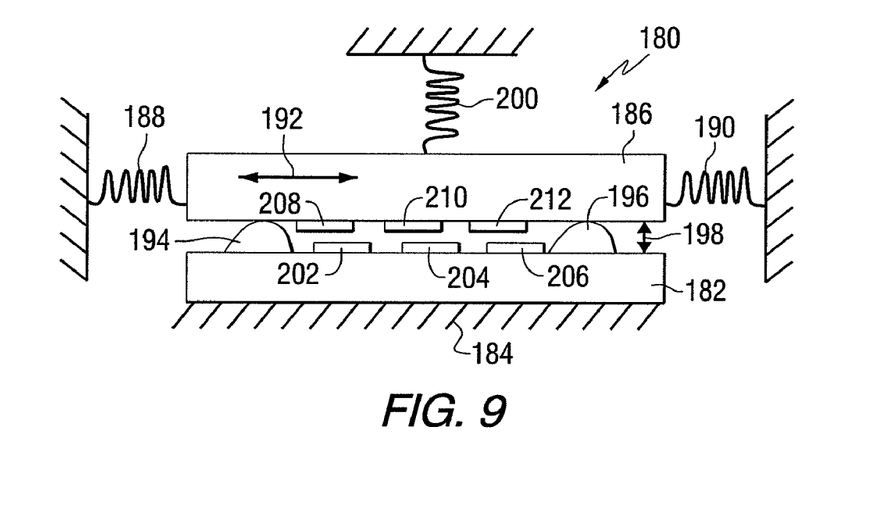
FIG. 9 is a schematic representation of another data storage device that can include an actuator constructed in accordance with another aspect of the invention.

FIG. 9 is a schematic representation of another data storage device 180 that can include an actuator constructed in accordance with another aspect of the invention. In this example, the data storage device includes a head substrate 182 mounted in a housing 184. The head substrate can support a plurality of heads not shown in this view. A storage media 186 is positioned in the housing and coupled to the housing by spring assemblies 188 and 190, which permit movement of the media in an X-Y plane, as illustrated by arrow 192. Posts 194 and 196 are used to define a distance 198 between the head substrate and the media. Spring 200 serves as a means for producing a force in a direction normal to the plane of the media, which maintains contact between the media and the posts. Actuating electrodes 202, 204, 206, 208, 210 and 212 are provided to produce forces on the media that are offset with respect to at least one axis of the media that passes through the media centroid. The media slides on the posts as it moves relative to the head substrate.

Variations of the example of FIG. 9 can have zero linear stiffness as well as zero rotational stiffness, for example with media sliding on posts or magnetically levitated, with or without any parasitic in-plane stiffness. In an alternative example, magnets could be used for preloading media against the posts.

While the above description relates to probe storage devices, this invention can also be applied to other devices that require movement in an X-Y plane, such as for example, atomic force microscope stages, magnetic recording drag testers, other general X-Y planar scanners, or X-Y motion platforms mounted on gimbals that have low in-plane stiffness requirements. In these applications, the movable member and suspensions might not be housed in an enclosure, but may be mounted in a case, base, frame, or other mounting structure. FIGS. 3, 4, 7 and 9 show particular arrangements for supporting the movable member, however, the invention is not limited to the illustrated support structures.

Figure 10:
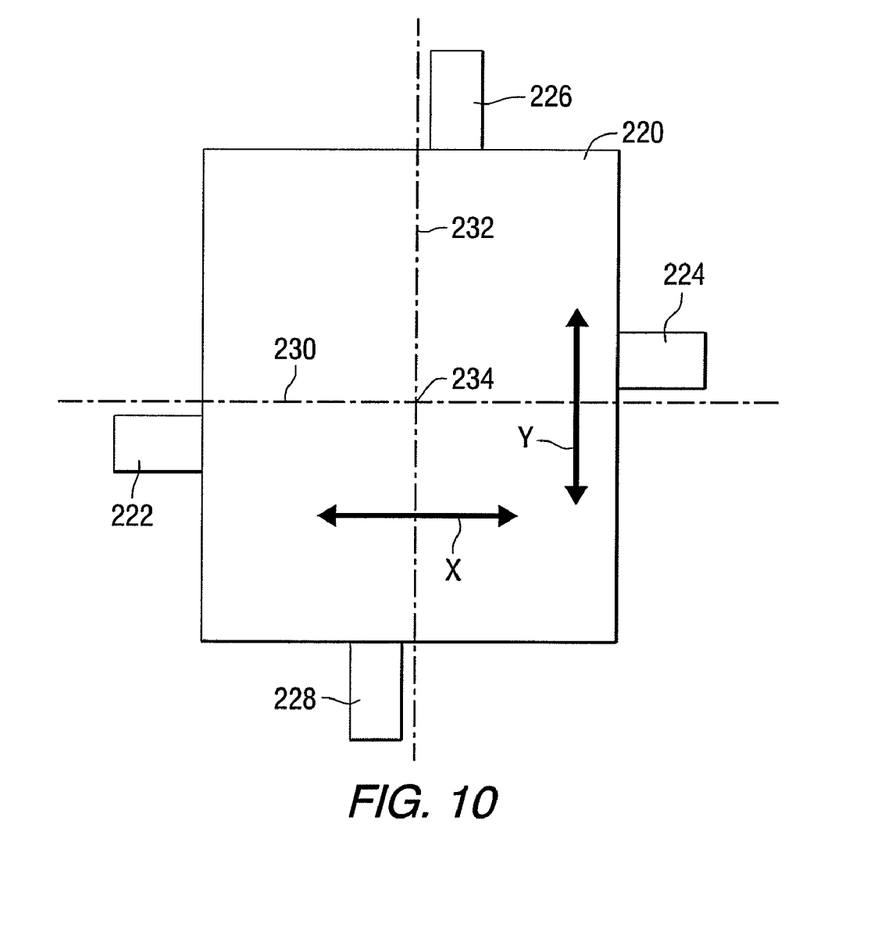
FIG. 10 is a schematic diagram of a movable member with offset actuators.

FIG. 10 is a schematic diagram of a movable member 220 with offset actuators 222, 224, 226 and 228. The actuators are offset with respect to perpendicular axes 230 and 232, which pass through a centroid 234 of the movable member. Actuators 222 and 224 exert forces in the movable member in the X-direction and actuators 226 and 228 exert forces in the movable member in the Y-direction. The actuators can be controlled as described above to control both linear and rotational movement of the movable member.

The invention is not limited to any particular type of suspension assembly for the movable member. For example, the assembly of FIG. 4 could be modified to include support springs that are attached close to the corners of the movable member.

Whereas particular embodiments have been described herein for the purpose of illustrating the invention and not for the purpose of limiting the same, it will be appreciated by those of ordinary skill in the art that numerous variations of the details, materials, and arrangement of parts may be made within the principle and scope of the invention without departing from the invention as described in the appended claims.

What is claimed is:

1. An apparatus comprising:
   a movable member in a plane;
   a support assembly coupled to opposite edges of the movable member at positions lying on a first axis that passes through a centroid of the movable member, wherein the support assembly comprises first and second rigid members positioned on opposite sides of the movable member, a first suspension assembly connected between a base and the first and second rigid members, and a second suspension assembly connected between the first and second rigid members and the movable member;
   first and second actuators coupled to the movable member at positions offset from the first axis, and exerting forces in the plane of the movable member in directions substantially parallel to and offset from the first axis to control both linear and rotational movement of the moveable member in the plane; and
   third and fourth actuators coupled to the first and second rigid members at positions offset from a second axis that passes through the centroid of the movable member, and exerting forces in the plane of the movable member in directions substantially parallel to and offset from the second axis to control both linear and rotational movement of the moveable member in the plane.

2. The apparatus of claim 1, further comprising:
   a controller for independently controlling the first and second actuators in response to position information.

3. The apparatus of claim 1, further comprising:
   a controller for independently controlling the first, second, third and fourth actuators in response to position information.

4. The apparatus of claim 1, wherein the actuators comprise one or more of:
   electromagnetic actuators, piezoelectric actuators, electrorheological fluid actuators, electrostatic actuators, shape memory alloy actuators, or thermal actuators.

5. An apparatus comprising:
   a data storage media;
   an array of tips positioned adjacent to the data storage media;
   a movable member in a plane, and coupled to either the data storage media or the array of tips;
   a support assembly coupled to opposite edges of the movable member at positions lying on a first axis that passes through a centroid of the movable member, wherein the support assembly comprises first and second rigid members positioned on opposite sides of the movable member, a first suspension assembly connected between a base and the first and second rigid members, and a second suspension assembly connected between the first and second rigid members and the movable member;
   first and second actuators coupled to the movable member at positions offset from the first, and exerting forces in the plane of the movable member in directions substantially parallel to and offset from the first axis to control both linear and rotational movement of the moveable member in the plane; and
   third and fourth actuators coupled to the first and second rigid members at positions offset from a second axis that passes through the centroid of the movable member and exerting forces in the plane of the movable member in directions substantially parallel to and offset from the second axis to control both linear and rotational movement of the moveable member in the plane.

6. The apparatus of claim 5, further comprising:
   a controller for independently controlling the first and second actuators in response to position information.

7. The apparatus of claim 6, further comprising:
   position sensors for producing the position information In response to position of the movable member.

8. The apparatus of claim 7, wherein the position sensors comprise at least one of:
   capacitive sensors, magnetic sensors, optical sensors, and strain gages.

9. The apparatus of claim 5, further comprising:
   a controller for independently controlling the first, second, third and fourth actuators In response to position signals and/or servo information to control both linear and rotational movement of the moveable member in the plane.

10. The apparatus of claim 5, wherein the actuators comprise one or more of:
    electromagnetic actuators, piezoelectric actuators, electrorheological fluid actuators, electrostatic actuators, shape memory alloy actuators, or thermal actuators.

11. The apparatus of claim 5, further comprising:
    a tip substrate; and
    a plurality of posts defining a distance between the data storage media and the tip substrate.

12. The apparatus of claim 1, wherein the first suspension assembly comprises first and second springs, and the second suspension assembly comprises third and fourth springs.

13. The apparatus of claim 12, wherein the first, second, third and fourth springs each have a rectangular cross-sectional shape.

14. The apparatus of claim 5, wherein the first suspension assembly comprises first and second springs, and the second suspension assembly comprises third and fourth springs.

15. The apparatus of claim 14, wherein the first, second, third and fourth springs each have a rectangular cross-sectional shape.

* * * * *